United States Patent
Prabhu

(10) Patent No.: US 6,983,398 B2
(45) Date of Patent: Jan. 3, 2006

(54) TESTING PROCESSORS

(75) Inventor: Manohar K. Prabhu, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 610 days.

(21) Appl. No.: 10/134,343

(22) Filed: Apr. 24, 2002

(65) Prior Publication Data

US 2003/0204805 A1    Oct. 30, 2003

(51) Int. Cl.
*G06F 11/00*    (2006.01)

(52) U.S. Cl. .................................... 714/12; 714/31

(58) Field of Classification Search .................. 714/12, 714/11, 18, 27, 28, 31, 39, 43, 726, 727, 733, 714/32, 33, 37
See application file for complete search history.

(56) References Cited

U.S. PATENT DOCUMENTS

| | | | |
|---|---|---|---|
| 4,414,669 A | 11/1983 | Heckelman et al. | |
| 4,695,946 A | 9/1987 | Andreasen et al. | |
| 4,701,845 A | 10/1987 | Andreasen et al. | |
| 4,727,549 A | 2/1988 | Tulpule et al. | |
| 5,157,781 A | 10/1992 | Harwood et al. | |
| 5,202,978 A | 4/1993 | Nozuyama | |
| 5,222,068 A | 6/1993 | Burchard | |
| 5,349,587 A * | 9/1994 | Nadeau-Dostie et al. | ... 714/729 |
| 5,878,256 A | 3/1999 | Bealkowski et al. | |
| 6,249,880 B1 * | 6/2001 | Shelly et al. | .................. 714/34 |
| 6,360,333 B1 * | 3/2002 | Jansen et al. | .................. 714/25 |
| 6,550,020 B1 * | 4/2003 | Floyd et al. | .................. 714/10 |
| 6,553,525 B1 * | 4/2003 | Shephard, III | .............. 714/733 |
| 6,662,133 B2 * | 12/2003 | Engel et al. | ................. 702/117 |
| 6,779,131 B2 * | 8/2004 | Pyapali et al. | .................. 714/8 |
| 2002/0059502 A1 * | 5/2002 | Reimer et al. | .............. 711/152 |
| 2002/0083387 A1 * | 6/2002 | Miner et al. | ................. 714/726 |
| 2003/0163773 A1 * | 8/2003 | O'Brien et al. | ............. 714/726 |
| 2003/0167144 A1 * | 9/2003 | Wang et al. | ................. 702/119 |

* cited by examiner

*Primary Examiner*—Nadeem Iqbal
(74) *Attorney, Agent, or Firm*—Tuan V. Ngo

(57) ABSTRACT

The present invention, in various embodiments, provides techniques for testing devices. In one embodiment, the device under test is a chip including a plurality of processors and a memory structure that stores test programs. One or more processors executes the test programs and generates test results based on which the chip may be determined good or bad. In one embodiment, the processors execute the test programs independent of each other, and no external hardware and/or test controller is required during the test phase. Various embodiments include a first processor that controls the scan chain of a second processor; the test results of the first processor are used as inputs for testing the second processor, etc.

76 Claims, 7 Drawing Sheets

TESTING PROCESSORS

FIELD OF THE INVENTION

The present invention relates generally to processors and, more specifically, to testing such processors.

BACKGROUND OF THE INVENTION

Testing electronic devices usually requires automatic test equipment (ATE) that provides data to stimulate the device inputs and compares the test results against expected data. Generally, the tester provides appropriate test signals and controls the test operations. For example, in testing a memory device, the tester, via the input/output (I/O) pins of the memory device, writes various sets of data into the memory, and reads the data from the memory. If the data read from the memory is the same as the data written into the memory, then the memory is good, i.e., functions properly. In this example, the tester provides appropriate signals to put the memory in the write or read mode as desired. The tester also compares the data read from the memory to the expected data usually provided by a test engineer since the test engineer usually provides the data written into the memory.

However, a tester for testing complex devices such as processors, especially at high-speed, are expensive, and can cost millions of dollars. Low-speed testers are less expensive, but require longer test time. A built-in self-test (BIST) mechanism enables a device to test itself, but usually requires circuits including a self-test controller that add significant complexity to the device and also use resources that can otherwise be used for other purposes. Testing packaged devices is easier to handle than testing the device at the wafer level, e.g., pre-packaged, but can be expensive because of the packaging costs. For example, if the device is bad, then the device package is wasteful. Testing at the wafer level commonly requires a clean and controlled environment. Depending on how the tests are developed, a particular test may detect a design flaw, a manufacturing defect, an operation defect, etc. High-coverage testing can also be expensive. However, leaving a defect to be found when the products have been shipped to customers usually increases the cost significantly, and may result in losing customers. Recently, multiprocessors are commonly found on a chip, and they need to be tested efficiently in a relatively less expensive manner.

Based on the foregoing, it is desirable that mechanisms be provided to solve the above deficiencies and related problems.

SUMMARY OF THE INVENTION

The present invention, in various embodiments, provides techniques for testing devices. In one embodiment, the device under test is a chip including a plurality of processors and a memory structure that stores test programs. One or more processors execute the test programs and generate test results based on which the chip may be determined good or bad. In one embodiment, the processors execute the test programs independent of each other, and no external hardware and/or test controller is required during the test phase. Various embodiments include a first processor that controls the scan chain of a second processor; a first processor that provides test results that are used as inputs for further testing a second processor, etc.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Figure 1:
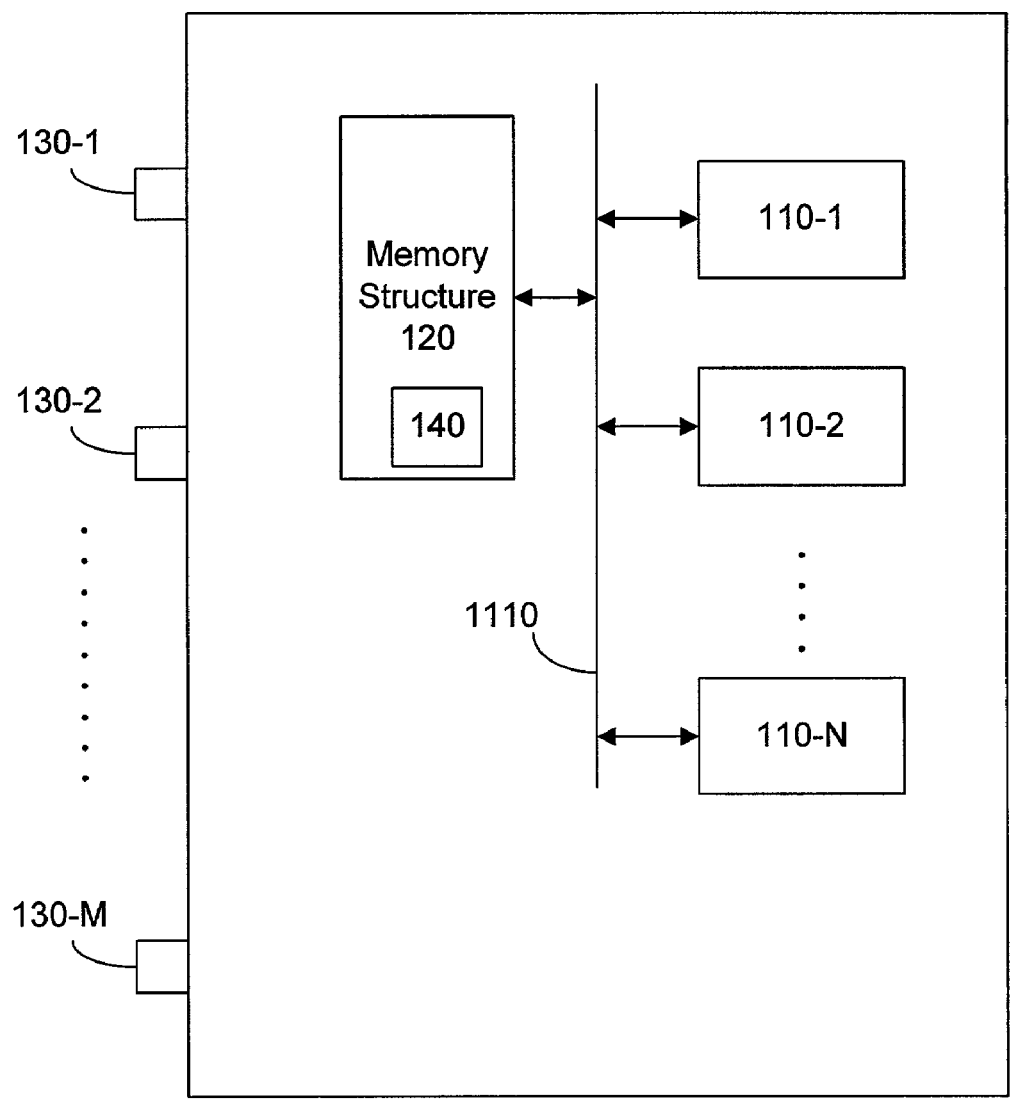
FIG. 1 shows a device upon which embodiments of the invention may be implemented.

FIG. 1 shows a chip 100 upon which embodiments of the invention may be implemented. Chip 100 includes a plurality of processors or central processing units (CPUs) 110-1, 110-2, ..., 110-N, a memory structure 120, and various input/output (I/O) pins 130-1, 130-2, ..., 130-M. Processors 110 communicate with memory structure 120 via bus 1100. I/O pins 130 are connected to processors 110, memory structure 120, and bus 1100 in various ways. However, to avoid obscuring the drawing, the connections are not shown.

The I/O Pins

I/O pins 130 are any mechanism that allows chip 100 to communicate with elements outside of chip 100, such as test equipment, probing stations, test data analyzers, etc. In various embodiments, test programs are transferred from, e.g., automated test equipment (ATE) through I/O pins 130 to memory structure 120. Similarly, test results provided by processors 110 inside chip 100 may be sent through pins 130 to be analyzed outside chip 100. Various embodiments include one or a combination that, as processors 110 execute the test programs, no I/O pin is exercised; during the test execution, additional test instructions and data are transferred via pins 130 to memory structure 120; as the test results are available, they are transferred outside chip 100 to be analyzed "off line" and/or in parallel with the test program executions. Pins 130 may use methods of communications such as conduction, radiation, convection, etc. For example, conduction may use the metal interconnects; radiation may use optical or wireless transceivers; convection may use detectable drafts of hot fluid, etc.

The Processors

Processors 110 are commonly found in computers and may be referred to as the brain of the computers. Generally, processors 110 execute instructions stored in memory structure 120, control logic, process information, perform arithmetic and logical operations, etc. A processor 110 may be the same or different in many ways such as structures, functions, or methods of operation. Two processors 110 may have one or a combination of differences including, for example, different architectures, cache sizes, functional units, error correction capabilities, instruction sets, instruction issue capabilities, clock speeds, power consumption characteristics, operating voltages, word lengths, execution reordering capabilities, testing capabilities, circuit technologies, circuit layouts, etc. Normally, instruction issue capabilities refer to the number of instructions that can be issued for execution within a cycle; word length refers to the number of bits of data used as an input for most arithmetic operations; and execution reordering capabilities refer to the ability to conduct sequential work in parallel or non-sequential order.

One or a set of various processors 110 tests one or a set of processors 110. One processor 110 may perform some tests while a processor 110 compares and analyzes the test results. Consequently, testing chip 100 may be referred to as "self-test" because chip 100 conducts tests using its own elements. Additionally, each processor 110 runs at its own clock frequency, which is usually much higher than that of the test equipment. For example, a tester can normally run at 1–10 MHz while processors 110 can run at the hundreds of Megahertz or Gigahertz ranges. Since test time is short, more tests may be implemented. In one embodiment, chip 100 is tested before being packaged, and thus reduces packaging costs via the elimination of defective chips prior to packaging. In an alternative embodiment, only a portion of the tests conducted on chip 100 uses the present invention. This reduces or supplements additional testing that does not utilize the invention.

A processor 110 may include configurable circuits such as field-programmable gate arrays (FPGAs), programmable logic devices (PLDs), programmable logic array (PLAs), generic array logics (GALs) and/or similar technologies. For example, FPGA cells are configured or programmed to perform the functions of a processor 110.

The Memory Structure

Memory structure 120 is computer memory or storage area arranged in different ways accessible to processors 110. Memory structure 120 commonly includes main memory and/or different various levels of caches. Generally, main memory stores instructions to be executed by processors 110, and may be referred to as physical memory, random-access memory (RAM), dynamic random-access memory (DRAM), read-only memory (ROM), etc. Information in memory 120 is obtained from outside of chip 100 via pins 130, is generated by processors 110 as part of the instructions that are executed by processors 110, is loaded or generated from other circuits on chip such as built-in self-test (BIST) circuits, or is designed to already contain the information, e.g., in ROMs.

Cache is a high-speed storage mechanism for quickly providing information to processors 110. In general, a cache stores commonly-used instructions or data, and thus saves times in fetching the data from main memory or other storage areas. A cache structure may include instruction caches for caching instructions, data caches for caching data, or general caches for caching both instructions and data. A cache may be individual, and thus private, to a processor 110, or may be shared among the several processors 110. A cache structure may include several levels, e.g., a first level, a second level, a third level, etc., wherein a lower level cache is commonly faster and/or is closer to processors 110 than a higher level cache.

Various embodiments of memory structure 120 include random-access memory (RAM), read-only memory (ROM), ROM shadowing, etc. In one embodiment, via ROM shadowing techniques and when appropriate, e.g., at system startup or when the test programs are first invoked, the test programs are copied from the slower ROM chips into faster memory or cache so that any access to the program code originally in the ROM will be faster. This is because, after the code has been copied to the faster memory, accessing the code accesses the faster memory, instead of the slower ROM. Techniques of the invention are not limited to a specific arrangement of cache or memory in memory structure 120, but are applicable to various arrangements including one or a combination of main memory, private, shared, and different levels and types of caches, etc.

The Test Programs

In one embodiment, memory structure 120 stores test programs to test various elements and/or different portions of chip 100. Exemplary elements of processors 110 to be tested include the arithmetic logic unit for mathematical calculations such as adding, subtracting, multiplying, etc., the control unit for decoding and executing instructions, the instruction fetch unit, the branch prediction units, the instruction queues, the floating point unit, etc. Exemplary elements of chip 100 to be tested include processors 110, memory structure 120, bus 1110 including data bus and instruction bus for processors 110 to communicate with each other and/or with memory structure 120, power control/reduction circuitry and logic, clock generation circuitry, etc. When all elements and portions of chip 100 are tested, the whole chip 100 is tested. In one embodiment, a test program includes instructions and data to stimulate functional elements of processors 110 and of chip 100. For example, if an adder is tested, then various values are provided to the inputs of the adder, which is then allowed to perform the adding function. If the result is as expected, i.e., it is the sum of the input values, then the adder is good. If bus structure 1110 is tested, then some data is provided to bus 1110 and the data should remain the same throughout bus 1110, etc. If memory structure 120 is tested, then the data written into the memory and the data read from the memory should be the same, etc.

Figure 2A:
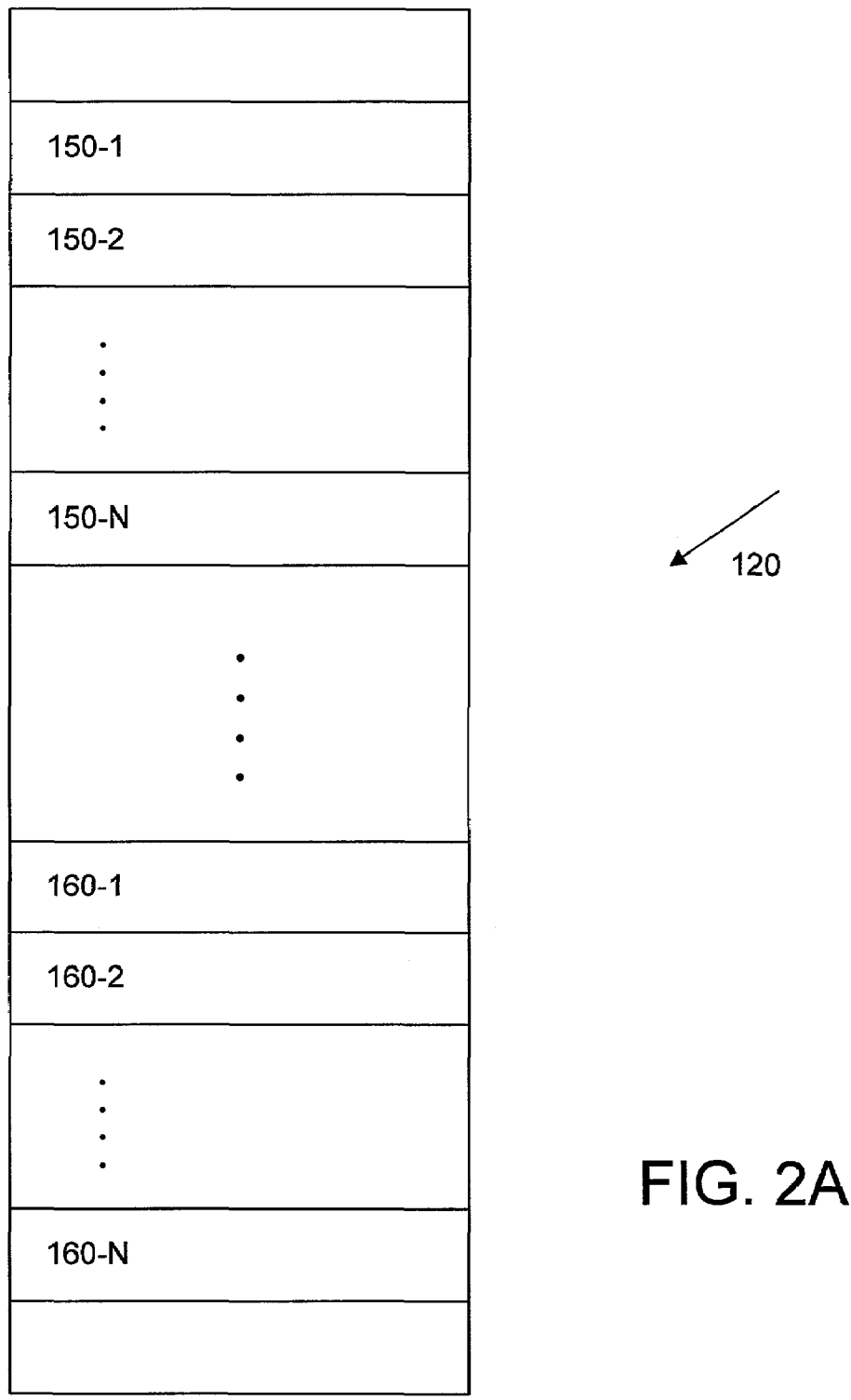
FIG. 2A shows a memory structure of the device in FIG. 1.

In one embodiment, a processor 110 corresponds to a test program, and each test program performs the same tests except for the locations for storing the test results for each processor. For example, processor 110-1, processor 110-2, . . . , processor 110-N, etc., correspond to test programs 150-1, 150-2, . . . 150-N, respectively, which are shown in FIG. 2A. Each test program in turns corresponds to a memory location, e.g., locations 1000, 2000, 3000, etc. When appropriate, a processor 110 executes its corresponding test program, e.g., processor 110-1 executes test program 150-1, processor 110-2 executes test program 150-2, processor 110-3 executes test program 150-3, etc. In one embodiment, a processor 110 also corresponds to a program counter pointing to the memory location storing the test program corresponding to the processor. At reset or when the test starts, a processor 110 starts its program pointed to by its corresponding program counter. Alternatively, each processor 110 is assigned a priority corresponding to a memory location or address. Processors 110 then execute the programs based on that priority. For example, three processors, e.g., processor 110-1, processor 110-2, and processor 110-3 are assigned priority one, priority two, and priority three, respectively. Processor 110-1, processor 110-2, and processor 110-3 then run the test programs for priority one, priority two, and priority three at, e.g., address 5000, 6000, and 7000, respectively. In one embodiment, the addresses for the lower priorities, e.g., priority two and priority three, are calculated based on the address of priority one. In the above example, for each priority, each 1000 is added to the address 5000. In one embodiment, an arbitration unit assigns the priority for each processor 110 that visits the arbitration unit. For example, the arbitration unit assigns priority one to the first processor visiting the arbitration unit, assigns priority two to the second processor visiting the arbitration unit, assigns priority three to the third processor, etc. The arbitration unit then either communicates these priorities to the appropriate processors 110 or uses these priorities to determine the corresponding values for the program counters, and these values are communicated to the appropriate processors 110 for them to invoke the corresponding test programs. In assigning the priorities, the arbitration unit uses one of the various ways including, for example, increasing or decreasing a later-assigned priority from a prior-assigned priority. The arbitration unit can be at any convenient location such as coupling to bus 1110.

In one embodiment, processors 110 use a dynamic synchronization technique to get the priorities in which a processor 110 communicates with another processor 110 to dynamically determine its priority. In one embodiment, the priority value is stored in a location, e.g., location 140 of memory structure 120. For illustration purposes, this value is referred to as V1. Processors 110 that seek to acquire a priority conduct the following algorithm. Each processor 110 acquires value V1 in location 140 and provides a new value, e.g., value V2, to replace value V1. At the time of attempting to store value V2 to location 140, if a processor, e.g., processor 110-1, determines that from the time it acquired value V1 to the time it is attempting to write location 140, location 140 has not experienced a store, then value V2 is stored in location 140. The processor that successfully wrote V2 into location 140, e.g., processor 110-1, in on embodiment, sets a flag associated with location 140 to indicate that a store has occurred to location 140. This processor 110-1 then uses value V1 to determine its priority. However, if from the time a processor, e.g., processor 110-1, acquired value V1 to the time it attempts to write value V2 into location 140, location 140 has experienced a store, then that processor 110-1's write attempt is prevented, and that processor 110-1 starts the process of acquiring the value for determining its priority again. A processor 110 acquires value V2 by various ways, including, for example, increasing or decreasing value V1, generating value V2 using V1 as an input in a mathematical calculation such as a modulus function, etc. The invention is not limited to how value V2 is obtained from value V1.

In one embodiment, each processor 110 receives the priority or initial program counter value during its manufacturing process in which the priority and/or the program counter value is placed in firmware or hard coded to each processor 110.

In one embodiment, a processor 110 executes its corresponding test program independent of other processors. Each processor 110 starts and/or stops its program any time, at irregular intervals, and/or without other processors knowing about it, as long as the test results are available to be analyzed when analyzing the test results starts. The processors' system clocks do not have to be cycle locked, e.g., one clock does not depend on another clock, etc. For example, a processor 110-1 may run its program in series or in parallel with a processor 110-2; processor 110-1 may stat at time t1 and stop at time t2 while processor 110-2 starts at time t3 and stops at time t4 wherein times t1, t2, t3, and t4 are different and independent of one another, etc. However, t1 is less than or equal to t2. Similarly, t3 is less than or equal to t4. Since, in one embodiment, each processor 110 corresponds to a test program and each test program can provide different tests, one processor 110 can run different tests from another processor 110 or analyze test results provided by other processors 110. For example, a processor 110-1 is testing a floating-point unit for a processor 110-2, while a processor 110-3 is testing an integer unit for a processor 110-4, and processor 110-5 compares the test results provided by processors 110-2 and 110-3, etc. In one embodiment, once a processor 110 finishes its test program, that processor sets a flag at a corresponding memory location so that other processors can take appropriate actions. For example, once each processor 110-1 and 110-2 finishes testing processor 110-3, each processor 110-1 and 110-2 sets a flag corresponding to the programs that each has executed. Processor 110-4, recognizing the flags of processors 110-1 and 110-2 have been set, starts running its program to analyze the test results provided by these processors 110-1 and 110-2. In an alternative embodiment, a processor 110 sets a flag when some portions of the test programs were executed so that the completed test results may be analyzed while additional tests are being executed.

In one embodiment, processors 110 share the same test program, but each processor 110, when executing the test program, provides its identification including its identity and/or priority. The test program uses this identity to recognize the processor 110 executing the test program so that each processor 110 can write into its corresponding memory location within memory structure 120 and/or can execute its program differently from the other processors 110. In one embodiment, each processor 110 is given an identity during the manufacturing process.

In one embodiment, the test results of a test program are used as inputs for the test program of another processor. For example, processor 110-1, via its program, multiplies by three the values in a range of memory locations, e.g., locations 1,000 to 1,999, and stores the multiplication results in locations 10,000 to 10,999. Processor 110-2, executing its corresponding program, divides the values in these locations by 3 and stores them in locations 11,000 to 11,999. Processor 110-3, also executing its program, compares the values in locations 1,000 to 1,999 to those in locations 11,000 to 11,999, etc.

Test programs are loaded into memory structure 120 in various ways, including, for example, using one or a combination of probe-test inputs, joint test action group (JTAG) inputs, input/output (I/O) ports, etc. In one embodiment, automatic test equipment (ATE) connected via pins 130 to chip 100, transfers the test programs to memory structure 120. In an alternative embodiment, the test programs are stored in the read-only memory (ROM) of memory structure 120.

Test programs are initiated in various ways including, for example, initiating via resetting a "test" pin to a logic low or high, initiating the test mode after power up or after executing some instructions in boot-up programs, etc. After the test mode is invoked, each processor 110 starts its corresponding test program, and the test programs control the tests, e.g., control how each test tests some portions of chip 100 or of processor 110. Alternatively, programs may be written to configure processors 110 to initiate the tests, execute the test programs, perform other functions, etc. Test programs are written in such a way that they cover desirable tests optionally including testing the whole chip 100.

In one embodiment, while executing their test programs, processors 110 create additional tests, which supplement or enhance the current test program or create new test programs. In one embodiment, test programs are created when some conditions are met. For example, if a particular variable in a first test program has a value 1, then a test for a multiplication unit is created as part of the current test program or of a second test program. However, if the value is a 2, then a test for a division unit is created for a third and/or a fourth test program, etc. The newly-created test programs are stored in the corresponding memory locations to be executed by the corresponding processors. For example, if processor 110-2 is to test the multiplication unit while processor 110-3 is to test the division unit, then the second and the third test programs in the above example are stored in the memory locations corresponding to processors 110-2 and 110-3, respectively.

In one embodiment, test programs are fed from outside chip 100 via pins 130 while other test programs are being executed. For example, while executing the first test program at location 1,000 to 1,999, the test data and/or test instructions are being loaded to locations 10,000 to 10,999 for the second test program. Any processor 110 may execute the second test program based on the corresponding priority and/or the address of the test programs as discussed above. A processor 110, before executing a test program, determines whether that test program is fully loaded, and, if so, executes that test program. In one embodiment, when each test program is fully loaded and thus ready to be executed, a corresponding flag in a memory location is set.

In the above discussion, the addresses of memory structure 120 are used as examples. The addresses in one example are independent of the addresses of other examples.

Programs, test programs and/or instructions executed by processors 110 may be stored in and/or carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memorychip or cartridge. Computer-readable media may also be coaxial cables, copper wire, fiber optics, acoustic or electromagnetic waves, capacitive or inductive coupling, etc.

The Test Results

Memory structure 120 also stores test results, which are the responses after processors 110 execute their test programs. For example, if a value one and a value two are provided to a two-input adder, and if the adder functions properly, then the response would be three, which is the result of adding one and two. If the adder functions improperly, then the result or the response could be any number. In one embodiment, a distinct section of memory structure 120 stores a set of test results for a processor 110. For example, sections 160-1, 160-2, . . . 160-N in FIG. 2A store the test results for processors 110-1, 110-2, . . . , 110-N, respectively. Each section 160 also corresponds to a memory location, e.g., locations 50000, 51000, 52000, etc.

In one embodiment, test results are in the form of signatures that give hints as to whether a particular operation or a tested unit is bad. For example, if an operation multiplies an integer by three and adds all digits of the multiplication results, then the final result for the operation should be 0, 3, 6, or 9. The value 0, 3, 6, or 9 is the signature for the operation. In one embodiment, the test analysis uses the test signatures to determine whether the chip is good or bad. In the above example, if, for example, the operation produces a number 8, then the operation is bad because a correct operation would provide a number 0, 3, 6, or 9. In one embodiment, it is not necessary to determine whether the adding or multiplying operation and/or the corresponding unit is bad. If a unit is bad, then the whole chip 100 is bad. Various embodiments exist in which the tests provide signatures such that analyzing a test signature can give hints to whether a particular portion or element of chip 100, e.g., a floating point, an ALU, a processor, etc., is bad. For example, summing all digits of a number multiplied by 9 provides a signature of 0 or 9. Similarly, summing the digits of a number multiplied by 3 provides a signature of 0, 3, 6, or 9. Further, multiplying a number by 9 and dividing the result of the multiplication by 3 provides the net effect of multiplying the same number by 3. Analyzing the signature of the multiplication and division provides hints as to whether the multiplication or the division unit is bad. For example, if a test analysis provides that the signature for the multiplication is good, e.g., a 0 or 9, while the signature for the division is bad, e.g., other than 0, 3, 6, or 9, then, the multiplication unit is good while the division unit is bad. In one embodiment, the test signature is provided via one or more pins 130 to be analyzed outside of chip 100.

In one embodiment, one processor 110 analyzes the test results provided by all processors 110. Alternatively, more than one processor 110 analyzes the test results. The more processors analyzing the test results, the higher the level of confidence that exists for the test results. For example, two processors 110 providing the same two sets of test analyses indicates that the test results are more probable to be accurate than just one processor 110 providing one set of test analyses. In one embodiment, two processors 110 perform the same test, and if the test results are the same for both processors 110, then the test results show evidence towards a good chip 100. However, if the test results are different, then the chip 100 is considered bad.

Test results can be used for detecting various types of defects, including, for example, manufacturing defects, design defects, operation defects, etc.

Test results can be on-chip or off-chip 100. In one embodiment, a flag in the form of a bit is used to indicate whether chip 100 is good or bad. Alternatively, the test results may identify which processor 110 or which unit, e.g., a floating point, an integer unit, etc., of a processor 110 is bad.

In one embodiment, chip 100 is tested at desired temperatures. Mechanisms to control the test temperature include, for example, controlling the temperature of the testing room, controlling the temperature of the plate carrying the chip 100 by spraying chemicals, e.g., gas, liquid, freon, etc., on chip 100. The cooling system may include sensing equipment, feedback control, etc.

Chip 100 shown in FIG. 1 is used as an example. Various configurations of chip 100 are within the scope of the invention. For example, each processor 110 is directly connected to its own cache and/or memory or a shared cache; each processor 110 may have the same or different architecture; various processors 110 may be in a cluster sharing the same bus and/or memory or cache, etc. In one embodiment, chip 100 is in the form of a semiconductor die and/or includes configurable circuits.

Scan Tests within the Chip

Figure 2B:
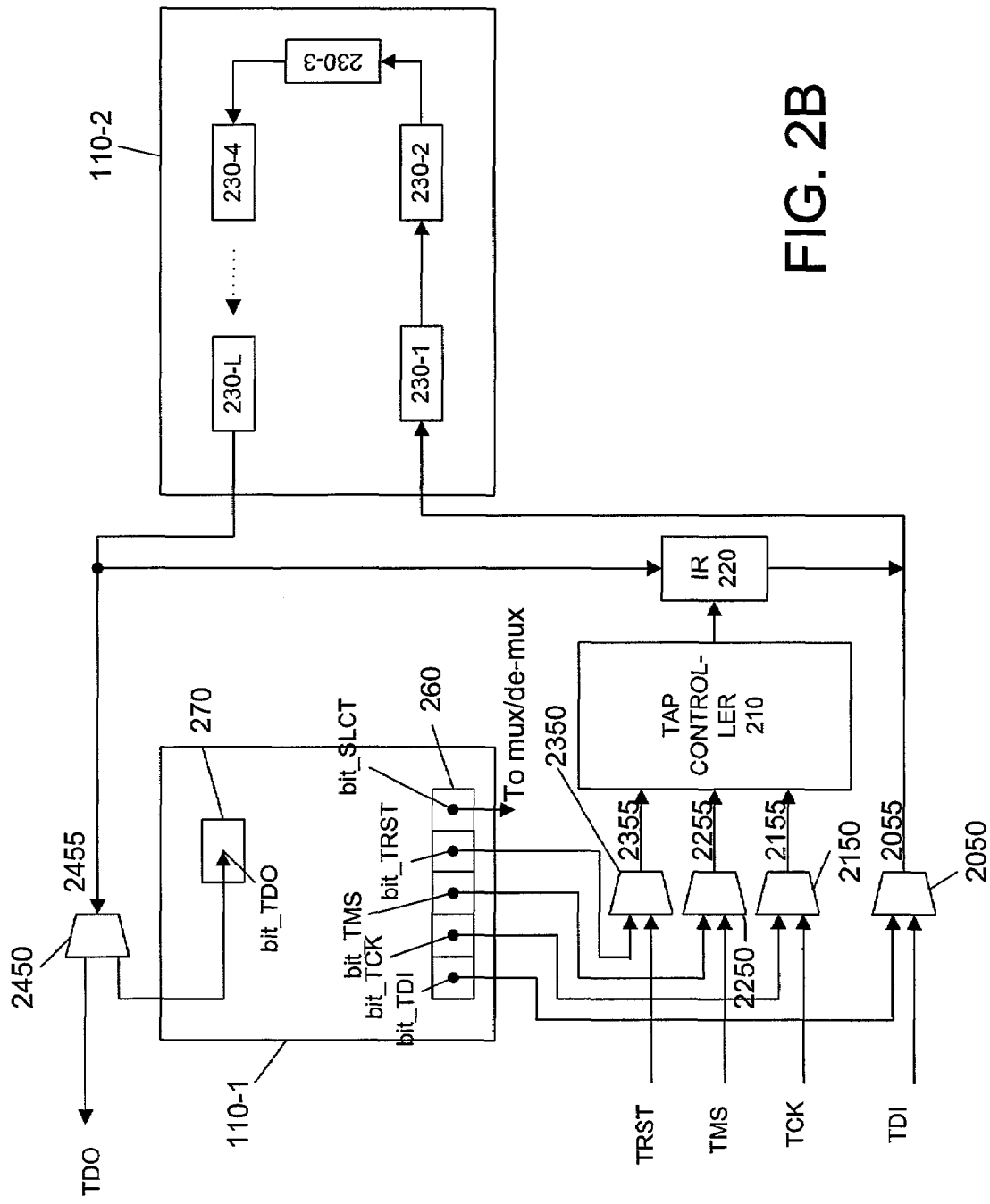
FIG. 2B shows a diagram used to illustrate first scan tests in accordance with one embodiment.

FIG. 2B shows a diagram used to illustrate a first embodiment of a scan test of chip 100. In FIG. 2B, a first processor, e.g., processor 110-1, scan tests or controls the scan test of a second processor, e.g., processor 110-2. Further, chip 100 includes a controller 210 for a test access port (TAP, not shown), an instruction register 220, and scan registers or scan cells 230-1 to 230-L. In one embodiment, the TAP accommodates scan pins including test clock (TCK), test mode select (TMS), and test reset (TRST). Additionally, the scan components 210, 220, and 230, etc., and thus the scan tests of processor 110-2 are in compliance with the IEEE 1149.1 standard. TAP controller 210 is a state machine and is programmed by the TMS and TCK inputs. TAP controller 210 controls the flow of data to instruction register 220 and data registers 230. Instruction register 220 decodes the instructions to be performed by scan registers 230, and selects scan registers 230 to be accessed. The TCK input provides the clock for the test logic and allows the serial test data path from TDI to TDO to be used independently of the system clock, e.g., the clock of processors 110 or of chip 100. The TMS input, in conjunction with the TCK input, changes the states in TAP controller 210, and also allows movement of data and TAP instructions. The TDI input provides serial inputs including both test instructions and test data. TDO is the serial output for test instructions and data from scan registers 230. A clock provided at the TCK input shifts the data in the chain between TDI input and TDO output. The TRST input provides asynchronous initialization of TAP controller 210, which in turns causes asynchronous initialization of other test logic. TRST, at reset, places processor 110-2 in the normal operating mode and inactivates scan registers 230.

Scan registers 230 include elements of chip 100 and of processors 110 to be tested. These elements include, for example, registers in memory 120, registers in the arbitration unit, registers in processors 110, etc. Registers in memory 120 include registers in the memory controller, etc. Registers of processors 110 includes registers in the CPU, the arithmetic unit, the load/store unit, the instruction decode unit, etc. Registers 230 can be in one or more processors 110. For example, the scan chain goes through registers 230 in processor 110-2, then processor 110-3, then processor 110-4, etc. However, for illustration purposes, FIG. 2B shows that registers 230 are in only processor 110-2. Observing and controlling the values held by registers 230 conduct the scan test. Scan registers 230 allow the test control via the scan pins, e.g., TDI, TCK, TMS, etc., to select whether registers 230 output the value the tested elements regularly hold or output the value provided from the scan path.

Processor 110-1 includes two registers 260 and 270. Processor 110-1 can write values into register 260 and read values from register 270. Register 260 includes bit_TDI, bit_TCK, bit_TMS, and bit_TRST each of which corresponds to each signal TDI, TCK, TMS, and TRST, respectively. Effectively, controlling register 260 via its bits controls the corresponding scan signals and thus the scan test of processor 110-2. For example, each of bit_TMS, bit_TRST, and bit_TDI can be set to desirable values while bit_TCK is pulsed as a clock. In one embodiment, register 260 changes voltage values for bit_TCK in a monotonic way. Register 260 also includes bit_SLCT, which controls the selection of the inputs and outputs of multiplexers and de-multiplexer 2050, 2150, 2250, 2350, and 2450. Generally, when processor 110-1 controls the scan test of processor 110-2, bit_SLCT is set so that bit_TDI, bit_TCK, bit_TMS, bit_TRST, and bit_TDO are connected to lines 2055, 2155, 2255, 2355, and 2455, respectively.

Register 270 includes bit_TDO, which corresponds to TDO. Reading values from register 270 allows observations of the scan chain data. In one embodiment, the value of bit_TDO is written into bit_TDI to recycle scan chain data. Alternatively, new data is written into bit_TDI to modify scan chain data, e.g., for scan chain testing. Two registers 260 and 270 are used as examples; one or more registers performing the same function of these two registers are sufficient.

Multiplexers 2050, 2150, 2250, 2350, and de-multiplexer 2450 connect the appropriate inputs and outputs of the multiplexers and de-multiplexer. For example, multiplexer 2050 selects either TDI or bit_TDI to be output on line 2055. Multiplexer 2150 selects either TCK or bit_TCK to be output on line 2155. Multiplexer 2250 selects either TMS or bit_TMS to be output on line 2255, etc. Multiplexers and de-multiplexer are used as examples, any mechanism connecting the appropriate inputs and outputs is effective.

Figure 2C:
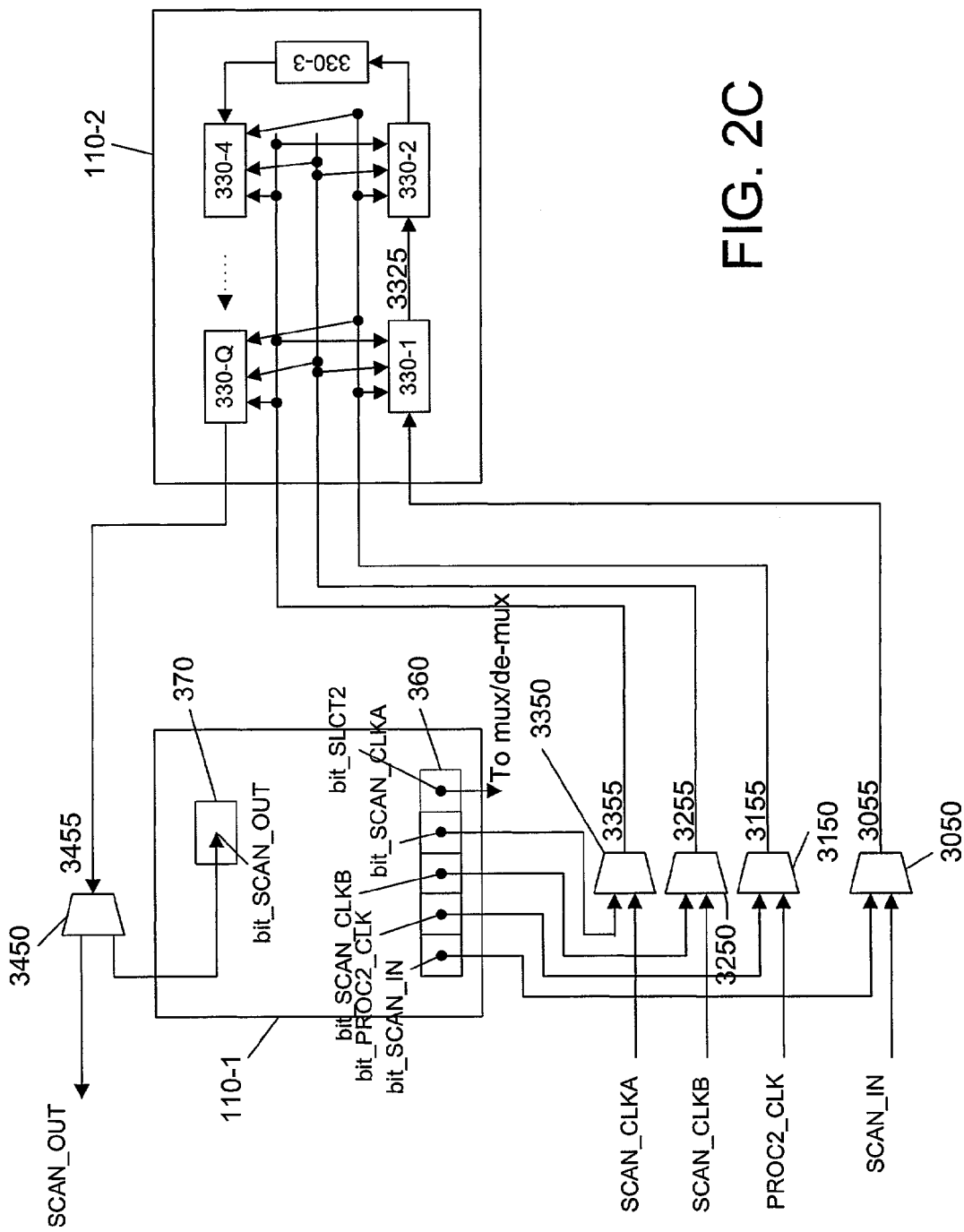
FIG. 2C shows a diagram used to illustrate second scan tests in accordance with one embodiment.

FIG. 2C shows a diagram used to illustrate a second embodiment of a scan test of chip 100. In FIG. 2C, a first processor, e.g., processor 110-1, scan tests or controls the scan test of a second processor, e.g., processor 110-2. Further, chip 100 includes scan registers or scan cells 330-1 to 330-Q. In one embodiment, the scan test accommodates scan pins including a system clock (CPU2_CLK), scan clock A (SCAN_CLKA), and scan clock B (SCAN_CLKB). Additionally, the scan registers 330 and thus the scan tests of processor 110-2 are generally in compliance with the level sensitive scan design (LSSD) methodology. The PROC2_CLK is the clock for processor 110-2 for regular operation. SCAN_CLKA and SCAN_CLKB provide the clocks for the test logic and allow the serial test data path from SCAN_IN to SCAN_OUT to be used independently of PROC2_CLK. The SCAN_IN input provides serial inputs including both test instructions and test data. SCAN_OUT is the serial output for test instructions and data from scan registers 330. SCAN_CLKA and SCAN_CLKB, which are two-phase, non overlapping shift clocks, shift the data in the chain between SCAN_IN input and SCAN_OUT output.

Scan registers 330 include elements of chip 100 and of processors 110 to be tested. These elements include, for example, registers in memory 120, registers in the arbitration unit, registers in processors 110, etc. Registers in memory 120 include registers in the memory controller, etc. Registers of processors 110 includes registers in the CPU, the arithmetic unit, the load/store unit, the instruction decode unit, etc. Registers 330 can be in one or more processors 110. For example, the scan chain goes through registers 330 in processor 110-2, then processor 110-3, then processor 110-4, etc. However, for illustration purposes, FIG. 2C shows that registers 330 are in only processor 110-2. Observing and controlling the values held by registers 330 conduct the scan test. Scan registers 330 allow the test control via the scan pins, e.g., SCAN_CLKA, SCAN_CLKB, PROC2_CLK, etc., to select whether registers 330 output the value the tested elements regularly hold or output the value provided from the scan path.

Processor 110-1 includes two registers 360 and 370. Processor 110-1 can write values into register 360 and read values from register 370. Register 360 includes bit_SCAN_IN, bit_PROC2_CLK, bit_SCAN_CLKB, and bit_SCAN_CLKA each of which corresponds to each signal SCAN_IN, PROC2_CLK, SCAN_CLKB, and SCAN_CLKA, respectively. Effectively, controlling register 360 via its bits controls the corresponding scan signals and thus the scan test of processor 110-2. For example, bit_SCAN_IN can be set to desirable values while bit_SCAN_CLKA, bit_SCAN_CLKB, and bit_PROC2_CLK are pulsed as clocks. In one embodiment, register 360 changes voltage values for bit_SCAN_CLKA, bit_SCAN_CLKB, and bit_PROC2_CLK in a monotonic way. Register 360 also includes bit_SLCT2, which controls the selection of the inputs and outputs of multiplexers and de-multiplexer 3050, 3150, 3250, 3350, and 3450. Generally, when processor 110-1 controls the scan test of processor 110-2, bit_SLCT2 is set so that bit_SCAN_IN, bit_PROC2_CLK, bit_SCAN_CLKB, bit_SCAN_CLKA, and bit_SCAN_OUT are connected to lines 3055, 3155, 3255, 3355, and 3455, respectively.

Register 370 includes bit_SCAN_OUT, which corresponds to SCAN_OUT. Reading values from register 370 allows observations of the scan chain data. In one embodiment, the value of bit_SCAN_OUT is written into bit_SCAN_IN to recycle scan chain data. Alternatively, new data is written into bit_SCAN_IN to modify scan chain data, e.g., for scan chain testing. Two registers 360 and 370 are used as examples; one or more registers performing the same function of these two registers are sufficient.

Multiplexers 3050, 3150, 3250, 3350, and de-multiplexer 3450 connect the appropriate inputs and outputs of the multiplexers and de-multiplexer. For example, multiplexer 3050 selects either SCAN_IN or bit_SCAN_IN to be output on line 3055. Multiplexer 3150 selects either PROC2_CLK or bit_PROC2_CLK to be output on line 3155. Multiplexer 3250 selects either SCAN_CLKB or bit_SCAN_CLKB to be output on line 3255, etc. Multiplexers and de-multiplexer are used as examples, any mechanism connecting the appropriate inputs and outputs is effective.

Figure 2D:
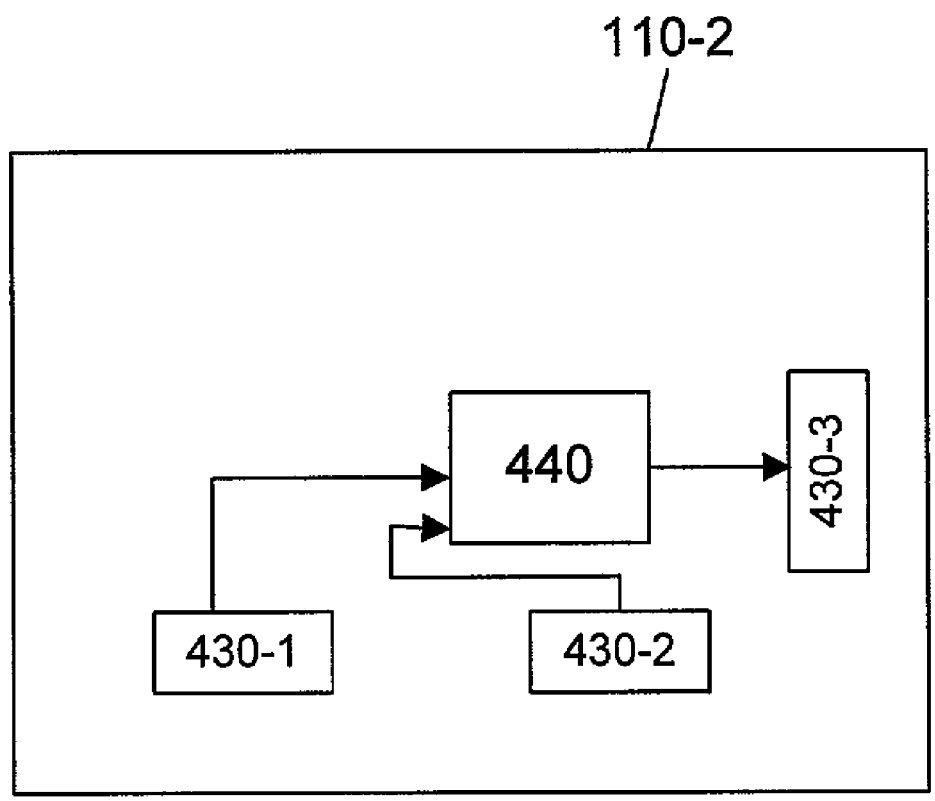
FIG. 2D shows a diagram used to illustrate scan tests of a combinational logic.

FIG. 2D shows a diagram used to illustrate how a combinational logic in processor 110-2 is tested using the scan techniques described in FIGS. 2B and 2C. For illustration purposes, the LSSD in FIG. 2C is used. Further, combinational logic 440 accepts inputs from two registers 430-1 and 430-2, and places its output in register 430-3. However, logic 440 may have zero, one, or multiple inputs and/or zero, one, or multiple outputs. Combinational logic 440 is part of the regular processing circuitry of processor 110-2, but was not shown in FIGS. 2B and 2C. To test logic 440, registers 430-1, 430-2, 430-3 are replaced with LSSD registers 330-1, 330-2, and 330-3, respectively. These LSSD registers are connected to appropriate scan test signals SCAN_CLKA, SCAN_CLKB, PROC2_CLK, etc., in a scan chain as in FIG. 2C. Controlling the values in registers 330-1 and 330-2 effectively controls the inputs to combinational logic 440, while observing the value in register 330-3 allows observing the output of combinational logic 440.

Figure 2E:
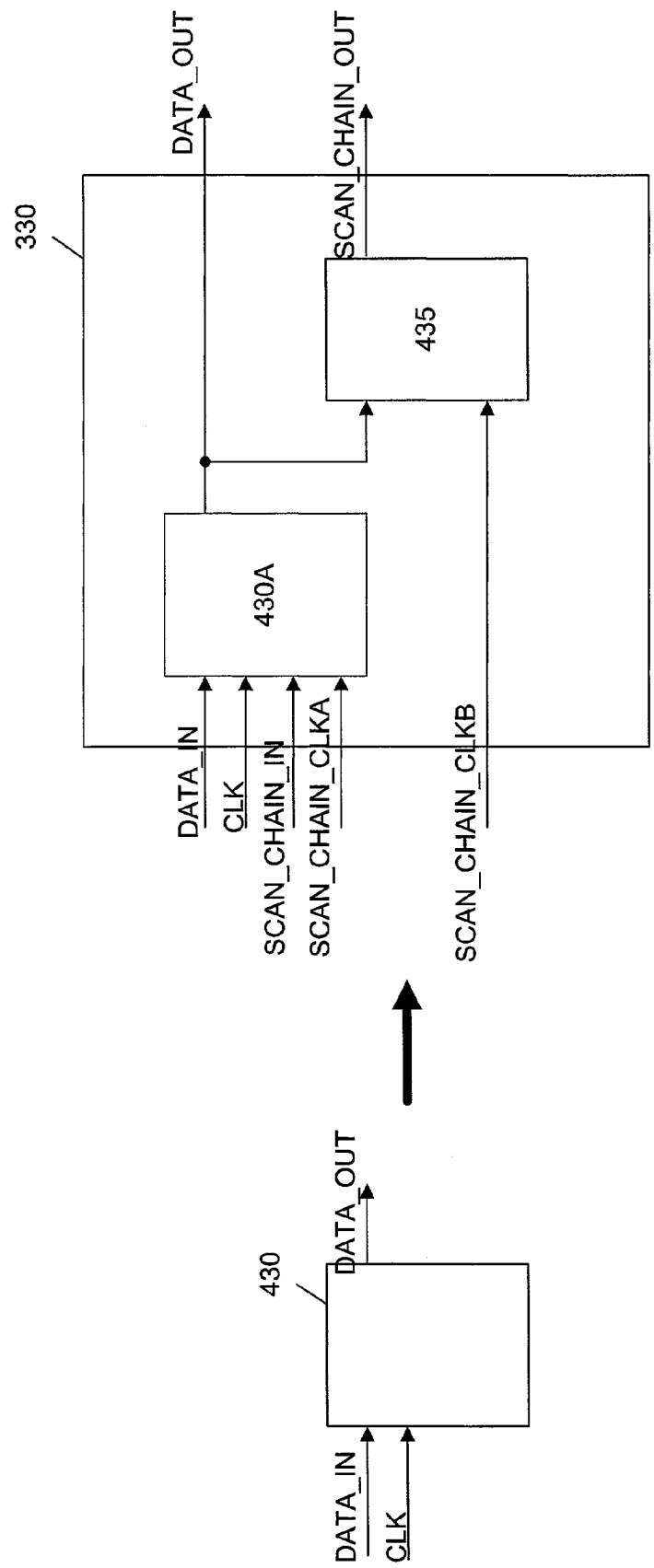
FIG. 2E is used to illustrate how a register is converted to a scan register in accordance with one embodiment.

FIG. 2E shows a register 430 being transformed into a register 330, in accordance with one embodiment using the LSSD. Register 430 includes a clock CLK, an input DATA_IN, and an output DATA_OUT. Register 330 includes register 430A and a "shift" register 435. Register 430A is similar to register 430, but register 430A includes an additional clock SCAN_CHAIN_CLKA and an input SCAN_CHAIN_IN. Register 435 includes a clock SCAN_CHAIN_CLKB, an input that is fed from output DATA_OUT, and an output SCAN_CHAIN_OUT. During regular operations when scan testing is not being conducted, input DATA_IN and output DATA_OUT are the normal input and output of register 430. Lines SCAN_CHAIN_IN, SCAN_CHAIN_CLKA, SCAN_CHAIN_CLKB, and SCAN_CHAIN_OUT form the shift portion of register 330. SCAN_CHAIN_IN is the shift data in and SCAN_CHAIN_OUT is the shift data out. SCAN_CHAIN_CLKA and SCAN_CHAIN_CLKB are the two-phase, non-overlapping shift clocks. Those skilled in the art will recognize that, for exemplary scan register 330-1, SCAN_CHAIN_CLKA corresponds to line 3355, SCAN_CHAIN_CLKB corresponds to line 3255, CLK corresponds to line 3155, SCAN_CHAIN_IN corresponds to line 3055, and SCAN_CHAIN_OUT corresponds to line 3325 in FIG. 2C.

In the above examples, a processor that scan tests another processor is used for illustration purposes. Various ways for using processors to scan test processors or other portions of chip 100 are within the scope of the invention. For example, a processor 110 scan tests more than one processor 110; a first processor scan tests a second processor, and the second processor scan tests the first processor; a first processor scan tests a second processor, the second processor scan tests a third processor, which may or may not scan test the first processor, etc.

Although in the above examples the processor 110-1 uses the scan chain to affect and/or observe registers in processor 110-2, other methods are within the scope of the invention. One embodiment does not use registers 260, 270, 360, or 370, but instead uses a bus to access the registers in processor 110-2 that are being observed or affected.

Techniques disclosed in this document, e.g., techniques in the section "THE TEST PROGRAMS," "THE TEST RESULTS," etc., can be used in combination with this section "SCAN TESTS WITHIN THE CHIP." For example, the program for processor 110-1 to scan test processor 110-2 can be selected from one or a combination of being loaded from external ATE, being loaded from memory, ROM or firmware, being generated while tests are executed, etc.

Method Steps

Figure 3:
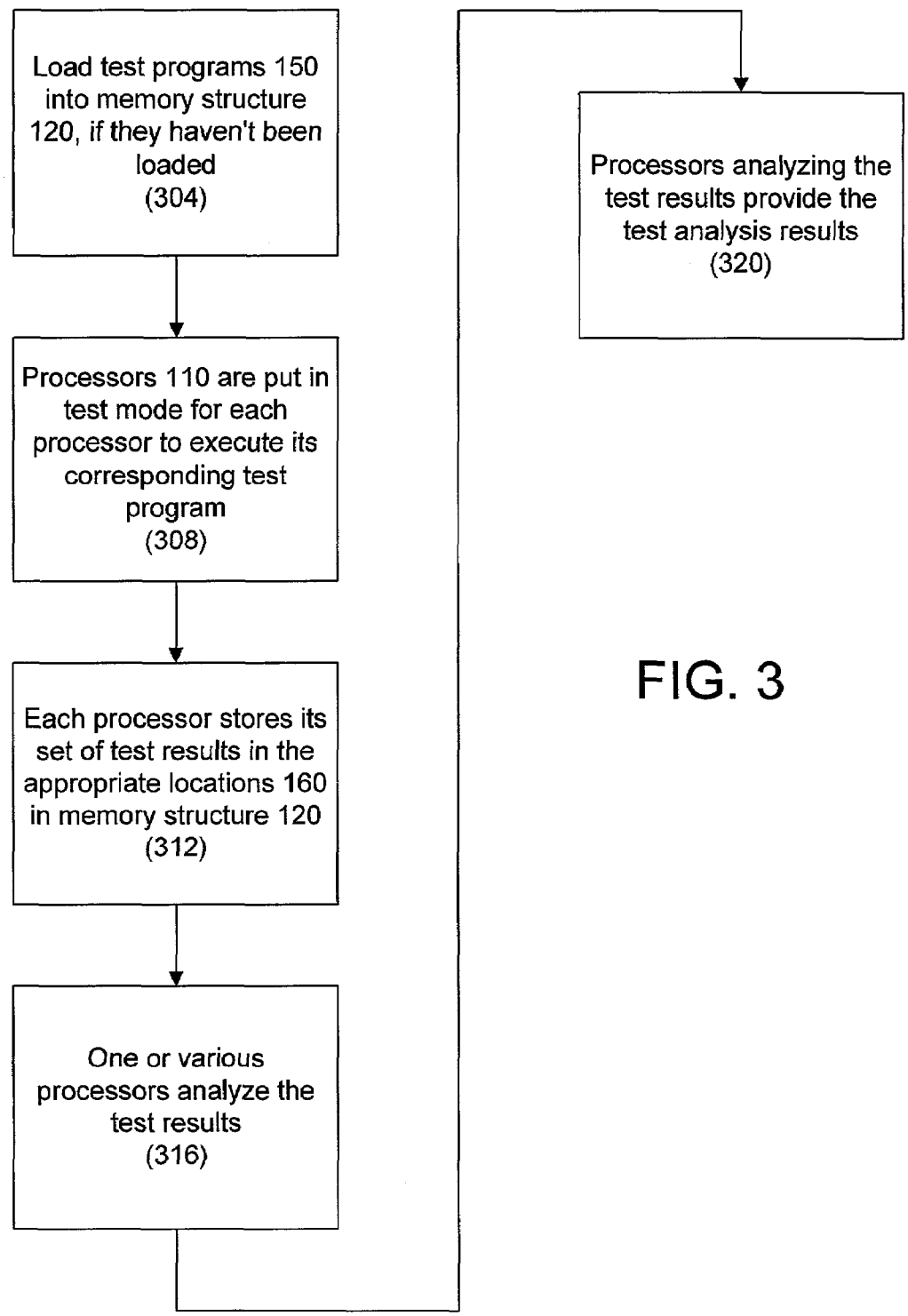
FIG. 3 is a flowchart illustrating the steps in testing the device in FIG. 1.

FIG. 3 is a flowchart illustrating the steps in testing chip 100 in accordance with one embodiment.

In step 304, if the test programs haven't been in memory structure 120, they are loaded into memory structure 120.

In step 308, processors 110 are put in the test mode for each processor to execute its corresponding test program.

In step 312, each processor 110 stores its set of test results in the appropriate locations in memory structure 120.

In step 316, one or various processors analyze the sets of test results. How the test results are analyzed depend on how the tests were performed. For example, if processor 110-1 and processor 110-2 run identical tests, then a processor 110 compares the test results provided by the two processors 110-1 and 110-2. If the two sets of test results are the same, then that provides evidence that chip 100 may be good. However, if two sets of test results are different, then chip 100 is bad. In embodiments where it is not necessary to determine what causes chip 100 to be bad, no further analysis of the test results is performed.

In step 320, the processor analyzing the test results provides the result of the analysis, which, in one embodiment, is stored in memory structure 120. Alternatively, the test analysis result is provided via one or more pins 130 to outside of chip 100.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method for testing a chip having at least two processors, comprising the steps of:
providing a memory structure on the same chip, having various sets of data;
configuring a first processor to use a first set of data to stimulate a first portion of the chip, thereby providing a first set of responses;
configuring a second processor to use a second set of data to stimulate a second portion of the chip, thereby providing a second set of responses; and
configuring a processor of the at least two processors to analyze the first set of responses and/or the second set of responses.

2. The method of claim 1 wherein the memory structure is selected from one or a combination of cache, cache with read-only memory shadowing, read-only memory, main memory.

3. The method of claim 1 wherein a processor and another processor of the at least two processors are substantially the same in structures, functions, and methods of operation.

4. The method of claim 1 wherein all processors of the at least two processors are substantially the same in structures, functions, and methods of operation.

5. The method of claim 1 wherein a processor and another processor of the at least two processors use substantially similar instruction sets, word lengths, clock speeds, and instruction issue capabilities.

6. The method of claim 1 wherein all processors of the at least two processors use substantially similar instruction sets, word lengths, clock speeds, and instruction issue capabilities.

7. The method of claim 1 wherein a piece of data of the second set of data is part of the first set of responses.

8. The method of claim 1 wherein a piece of data of the various sets of data is created by a processor of the at least two processors using its set of data.

9. The method of claim 1 wherein a piece of data of the various sets of data is created by a circuit on the chip.

10. The method of claim 1 wherein the first processor uses a priority to locate the first set of data.

11. The method of claim 1 wherein a processor of the at least two processors corresponds to a priority corresponding to a memory location.

12. The method of claim 11 wherein a first priority of a processor of the at least two processors is calculated based on a second priority of another processor of the at least two processors.

13. The method of claim 11 wherein a priority corresponding to a processor of the at least two processors is selected from a group consisting of a priority assigned by an arbitration unit and a priority assigned during a manufacturing process.

14. The method of claim 11 wherein a processor of the at least two processors uses a dynamic synchronization technique to acquire its priority.

15. The method of claim 11 wherein a processor of the at least two processors that seeks to acquire its priority conducts the following steps:
obtaining a first value in a memory location corresponding to the first value;
providing a second value to replace the first value in the memory location corresponding to the first value;
if, from the time of obtaining the first value to the time of attempting to replace the first value by the second value, the location corresponding to the first value has not experienced a store, then writing the second value in that location.

16. The method of claim 11 wherein the memory location corresponds to a test program and/or test data.

17. The method of claim 1 wherein the first set of data and the second set of data are part of a program; the first processor providing a first identification to use the first set of data.

18. The method of claim 1 wherein a piece of data of the various sets of data is provided from outside of the chip while a processor of the at least two processors is using its corresponding set of data to stimulate a portion of the chip.

19. The method of claim 1 wherein the first set of responses provides a signature giving an indication of whether an operation of the chip functions properly.

20. The method of claim 1 wherein a piece of data from the first set of responses is transferred to outside of the chip while the first processor is stimulating the first portion of the chip.

21. The method of claim 1 wherein the first processor runs its first set of data independently in time of the second processor running its second set of data.

22. The method of claim 1 further comprising the step of including a configurable circuit in the chip.

23. A method for testing a portion of a chip embodying at least a first processor and a second processor, comprising the steps of:
connecting a register to an input of the tested portion; the register being in the first processor;
making the register accessible to the second processor;
using execution of the second processor to affect a value of the register, thereby affecting a value at an output of the tested portion; and
observing the value at the output of the tested portion.

24. The method of claim 23 further comprising the step of using the register in a scan chain register.

25. The method of claim 24 further comprising the step of identifying the register as a first register and connecting a second register on the chip to the scan chain register for affecting a value of the scan chain register; the execution of the second processor affecting a value of the second register.

26. The method of claim 23 further comprising the step of connecting a bus on the chip to the register for affecting a value of the register; the execution of the second processor affecting a value of the bus.

27. The method of claim 23 wherein the tested portion is in the first processor.

28. The method of claim 23 wherein the value of the register is from one or a combination of a program and output of the program; and the program is selected from one or a combination of being loaded from outside the chip, being in memory on the chip, being generated by a circuit on the chip, being generated while executing a program.

29. A method for testing a portion of a chip embodying at least a first processor and a second processor, comprising the steps of:

connecting a register to an output of the tested portion; the register being in the first processor;

making the register accessible to the second processor;

providing data to an input of the tested portion, thereby affecting a value of the register; and using execution of the second processor to observe the value of the register.

30. The method of claim 29 further comprising the step of using the register in a scan chain register.

31. The method of claim 30 further comprising the steps of identifying the register as a first register and connecting a second register on the chip to the scan chain register for observing a value of the scan chain register; the execution of the second processor causing the value of the scan chain register to be stored in the second register.

32. The method of claim 29 further comprising the step of connecting a bus on the chip to the register for observing a value of the register; the execution of the second processor causing the value of the register to appear on the bus.

33. The method of claim 29 wherein the tested portion is in the first processor.

34. The method of claim 29 wherein the value of the register is used in a program selected from one or a combination of being loaded from outside the chip, being in memory on the chip, being generated by circuits on the chip, being generated while executing a program.

35. A chip comprising:
a memory structure having various sets of data; and
at least two processors including a first processor and a second processor; wherein
the first processor is configured to use a first set of data to stimulate a first portion of the chip, thereby providing a first set of responses;
the second processor is configured to use a second set of data to stimulate a second portion of the chip, thereby providing a second set of responses;
a processor of the at least two processors is configured to analyze the first set of responses and/or the second set of responses.

36. The chip of claim 35 wherein the memory structure is selected from one or a combination of cache, cache with read-only memory shadowing, read-only memory, main memory.

37. The chip of claim 35 wherein a processor and another processor of the at least two processors are substantially the same in structures, functions, and methods of operation.

38. The chip of claim 35 wherein all processors of the at least two processors are substantially the same in structures, functions, and methods of operation.

39. The chip of claim 35 wherein a processor and another processor of the at least two processors use substantially similar instruction sets, word lengths, clock speeds, and instruction issue capabilities.

40. The chip of claim 35 wherein all processors of the at least two processors use substantially similar instruction sets, word lengths, clock speeds, and instruction issue capabilities.

41. The chip of claim 35 wherein a piece of data of the second set of data is part of the first set of responses.

42. The chip of claim 35 wherein a piece of data of the various sets of data is created by a processor of the at least two processors using its set of data.

43. The chip of claim 35 wherein a piece of data of the various sets of data is created by a circuit on the chip.

44. The chip of claim 35 wherein the first processor uses a priority to locate the first set of data.

45. The chip of claim 35 wherein a processor of the at least two processors corresponds to a priority corresponding to a memory location.

46. The chip of claim 45 wherein a first priority of a processor of the at least two processors is calculated based on a second priority of another processor of the at least two processors.

47. The chip of claim 45 wherein a priority corresponding to a processor of the at least two processors is selected from a group consisting of a priority assigned by an arbitration unit and a priority assigned during a manufacturing process.

48. The chip of claim 45 wherein a processor of the at least two processors uses a dynamic synchronization technique to acquire its priority.

49. The chip of claim 45 wherein a processor of the at least two processors that seeks to acquire its priority conducts the following steps:
obtaining a first value in a memory location corresponding to the first value;
providing a second value to replace the first value in the memory location corresponding to the first value;
if, from the time of obtaining the first value to the time of attempting to replace the first value by the second value, the location corresponding to the first value has not experienced a store, then writing the second value in that location.

50. The chip of claim 45 wherein the memory location corresponds to a test program and/or test data.

51. The chip of claim 35 wherein the first set of data and the second set of data are part of a program; the first processor providing a first identification to use the first set of data.

52. The chip of claim 35 wherein a piece of data of the various sets of data is provided from outside of the chip while a processor of the at least two processors is using its corresponding set of data to stimulate a portion of the chip.

53. The chip of claim 35 wherein the first set of responses provides a signature giving an indication of whether an operation of the chip functions properly.

54. The chip of claim 35 wherein a piece of data from the first set of responses is transferred to outside of the chip while the first processor is stimulating the first portion of the chip.

55. The chip of claim 35 wherein the first processor runs its first set of data independently in time of the second processor running its second set of data.

56. The chip of claim 35 wherein a configurable circuit is part of the chip.

57. A chip comprising:
a first processor configured for testing a portion of the chip;
a register that is connected to an input of the tested portion, is in a second processor, and is accessible to the first processor;
means for execution of the first processor to affect a value of the register, thereby affecting a value at an output of the tested portion; and
means for observing the value at the output of the tested portion.

58. The chip of claim 57 wherein the register is part of a scan chain register.

59. The chip of claim 58 wherein the register is identified as a first register, the chip further comprises a second register connected to the scan chain register for affecting a value of the scan chain register, and execution of the first processor affects a value of the second register.

60. The chip of claim 57 further comprising a bus connected to the register wherein the bus serves as means for affecting the value of the register.

61. The chip of claim 57 wherein the tested portion is in the second processor.

62. The chip of claim 57 wherein the value of the register is from one or a combination of a program and output of the program; and the program is selected from one or a combination of being loaded from outside the chip, being in memory on the chip, being generated by a circuit on the chip, being generated while executing a program.

63. A chip comprising:
   a first processor configured for testing a portion of the chip;
   a register that is connected to an output of the tested portion, is in a second processor, and is accessible to the first processor;
   means for providing data to an input of the tested portion, thereby affecting a value of the register; and
   means for execution of the first processor to observe the value of the register.

64. The chip of claim 63 wherein the register is part of a scan chain register.

65. The chip of claim 64 wherein the register is identified as a first register, the chip further comprises a second register connected to the scan chain register for observing a value of the scan chain register, and the execution of the first processor causes the value of the scan chain register to be stored in the second register.

66. The chip of claim 63 further comprising a bus connected to the register wherein the bus serves as means for observing the value of the register.

67. The chip of claim 63 wherein the tested portion is in the second processor.

68. The chip of claim 63 wherein the value of the register is used in a program selected from one or a combination of being loaded from outside the chip, being in memory on the chip, being generated by circuits on the chip, being generated while executing a program.

69. A computer-readable medium embodying instructions for causing a computer to perform a method for testing a chip having at least two processors and a memory structure including various sets of data, the method comprising the steps of:
   configuring a first processor to use a first set of data to stimulate a first portion of the chip, thereby providing a first set of responses;
   configuring a second processor to use a second set of data to stimulate a second portion of the chip, thereby providing a second set of responses; and
   configuring a processor of the at least two processors to analyze the first set of responses and/or the second set of responses.

70. The computer-readable medium of claim 69 wherein a processor and another processor of the at least two processors are substantially the same in structures, functions, and methods of operation.

71. The computer-readable medium of claim 69 wherein a piece of data of the various sets of data is created by a processor of the at least two processors using its set of data.

72. The computer-readable medium of claim 69 wherein a processor of the at least two processors corresponds to a priority corresponding to a memory location.

73. The computer-readable medium of claim 69 wherein a piece of data of the various sets of data is transferred between the chip and outside of the chip while a processor of the at least two processors is using its corresponding set of data to stimulate a portion of the chip.

74. The computer-readable medium of claim 69 wherein the first processor runs its first set of data independently in time of the second processor running its second set of data.

75. A computer-readable medium embodying instructions for causing a computer to perform a method for testing a portion of a chip embodying at least a first processor and a second processor, the method comprising the steps of:
   using execution of the first processor to affect a value of a register, thereby affecting a value at an output of the tested portion;
   observing the value at the output of the tested portion; and
   selecting the value of the register from one of a combination of a program and output of the program;
   wherein the program is selected from one or a combination of being loaded from outside the chip, being in memory on the chip, being generated by a circuit on the chip, being generated while executing a program; and
   the register is connected to an input of the tested portion and is in the second processor.

76. A computer-readable medium embodying instructions for testing a portion of a chip embodying at least a first processor and a second processor, the method comprising the steps of:
   providing data to an input of the tested portion, thereby affecting a value of a register;
   using execution of the first processor to observe the value of the register; and
   using the value of the register in a program selected from one or a combination of being loaded from outside the chip, being in memory on the chip, being generated by circuits on the chip, being generated while executing a program;
   wherein the register is connected to an output of the tested portion and is in the second processor.

* * * * *